Figure 1:
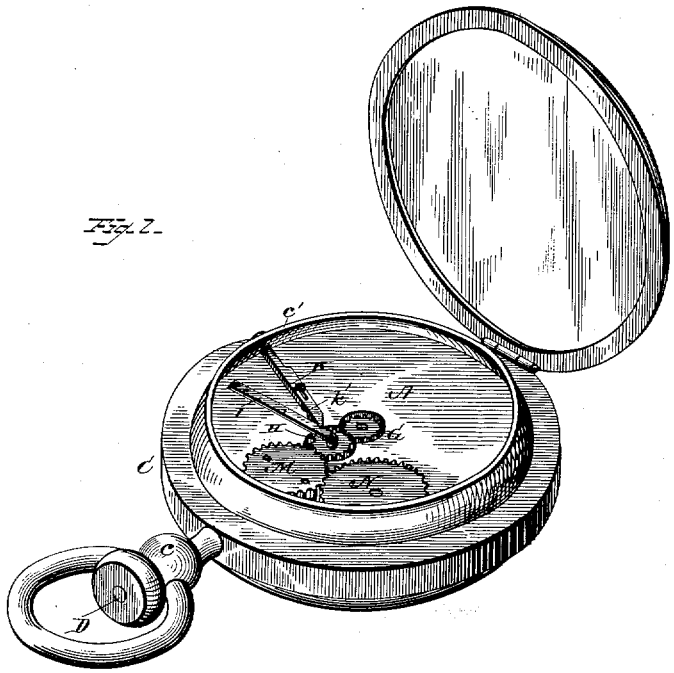

H. R. SMITH & R. FOLSOM,

Assignors to THE ELGIN NATIONAL WATCH COMPANY.

STEM WINDING WATCH.

No. 10,554. Reissued Jan. 27, 1885.

Witnesses

F. L. Durand

Henry C. Hazard

Inventors.

H. R. Smith & R. Folsom, by

Prindle & Russell, their Attys

UNITED STATES PATENT OFFICE.

HARRY R. SMITH, OF CINCINNATI, OHIO, AND RUFUS FOLSOM, OF BOSTON, MASSACHUSETTS, ASSIGNORS TO THE ELGIN NATIONAL WATCH COMPANY, OF ELGIN, ILLINOIS.

STEM-WINDING WATCH.

SPECIFICATION forming part of Reissued Letters Patent No. 10,554, dated January 27, 1885.

Original No. 119,889, dated October 10, 1871. Application for reissue filed January 8, 1885.

*To all whom it may concern:*

Be it known that we, HARRY R. SMITH, of Cincinnati, in the county of Hamilton and State of Ohio, and RUFUS FOLSOM, of Boston, in the county of Suffolk and State of Massachusetts, (formerly of Cincinnati aforesaid,) did invent certain new and useful Improvements in Stem-Winding Watches, for which Letters Patent of the United States No. 119,889 were issued to us upon the 10th day of October, 1871, which Letters Patent have been found to be inoperative and invalid, and not to cover the invention set forth in the specification and shown in the drawings which were filed in the Patent Office upon the 3d day of June, 1871, preparatory to the obtaining of the said Letters Patent. Now, therefore, being desirous of reissuing the said Letters Patent, we have prepared and do hereby declare the following to be a full, clear, and exact description of our said improvements, reference being had to the accompanying drawings, in which—

Figure 2:
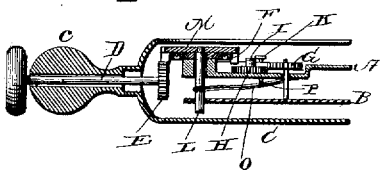
Figure 3:
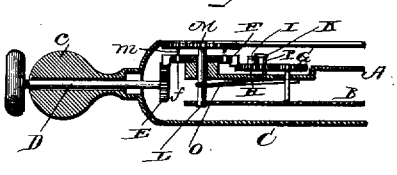
Figure 4:
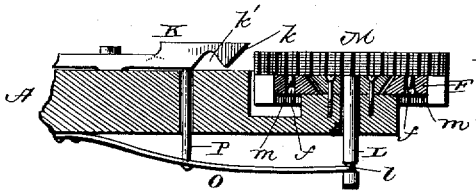
Figure 5:
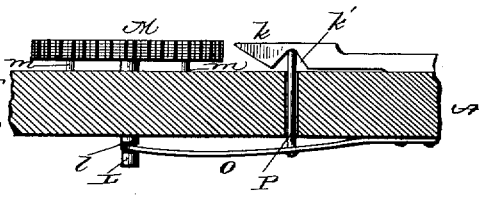

Figure 1 is a perspective view of a watch containing our improvements, the dial being removed to show the arrangement of parts. Figs. 2 and 3 are enlarged sections of the same upon a line with the axis of the stem, and show, respectively, the relative positions of parts when the dial-wheels are out of and in engagement with the stem. Fig. 4 is a side elevation, partly in section, of mechanism used for connecting the stem with the winding-arbor, said parts being connected; and Fig. 5 is a like view of the same with said stem and winding-arbor disconnected.

Letters of like name and kind refer to like parts in each of the figures.

In the use of watches in which the hands are set by means of or through the stem great difficulty has been experienced in placing the dial-wheels in engagement or removing them from engagement with the stem without disturbance of the hands and a movement of the same from the position to which they had been adjusted.

To obviate this difficulty is the design of our invention, which consists, principally, as an improvement in stem-winding and hand-setting watches, in combining with one of the dial-wheels and with a stem-driven wheel an intermediate wheel which is adapted to rotate in a plane parallel with the watch-plate, and is shiftable in a direction perpendicular thereto to cause said wheels to be connected with or disconnected from each other, substantially as and for the purpose hereinafter specified.

It consists, further, as an improvement in stem-winding and hand-setting watches, in combining with the winding-arbor wheel and with a stem-driven wheel a wheel which is adapted to rotate in a plane parallel with the watch-plate, and is shiftable in a direction perpendicular thereto, to cause said wheels to be connected with or disconnected from each other, substantially as and for the purpose hereinafter shown.

It consists, further, as an improvement in stem-winding and hand-setting watches, in a train composed in part of a wheel which is adapted to form a connection between one of the dial-wheels and a stem-driven wheel, and is rotatable in a plane parallel with the watch-plate and shiftable in a direction perpendicular thereto to connect or disconnect said wheels, in combination with the stem of the watch, and with means, substantially as shown, whereby, as said train is thus connected with or disconnected from said dial-wheels, said stem is simultaneously disconnected from or connected with the winding-arbor wheel, substantially as and for the purpose hereinafter set forth.

It consists, finally, in the construction and combination of the parts of the device, substantially as and for the purpose hereinafter shown and described.

In the annexed drawings, A represents the front or pillar plate, and B the back plate, of a watch, which plates are connected together in the usual manner, and furnish bearings for the time-train. The movement thus constructed is placed within a case, C, that is provided with a pendant, *c*, within which is journaled a push-pin or stem, D.

Upon the inner end of the stem D is secured a pinion, E, which meshes with a toothed wheel, F, that is journaled upon the plate A, and is adapted to rotate in a plane parallel with said plate, and having a right angle to said stem. At the center of said plate is journaled a dial-wheel, G, and between the latter and said wheel F is placed a pinion, H, that has such diameter as to enable it to mesh with each of said wheels. The intermediate pinion, H, is journaled upon one end of a spring-bar, I, that has its opposite end secured to the plate A in such manner as to permit its free end to be moved in a line perpendicular to the plane of said plate, and thereby cause the wheels F and G to be connected with or disconnected from each other. When said parts occupy the position shown in Fig. 2, the dial-wheels are not connected with the stem D, but when arranged as seen in Fig. 3 said dial-wheels and stem are connected, so that the rotation of the latter will cause the former to revolve and enable the hands to be set. The tension of the spring-bar I causes it, when not obstructed, to hold the pinion H in engagement with its wheels F and G, and in order that said parts may be disconnected, when desired, a bar, K, is secured upon the plate A, and extends from a point just outside of the bezel $c'$ to and over the inner end of said spring-bar. The said bar K is secured in place, so as to have longitudinal motion within certain limits, and its lower side at its inner end has an outward and upward inclination, which enables it to pass over said spring-bar. If, now, the push-bar K is moved inward to the limit of its motion in such direction, its inclined end $k$ will press the inner end of the spring-bar I, with the pinion H, downward until the dial-wheel G is disconnected from the wheel F, while by drawing said bar K outward said spring-bar will be relieved from downward pressure, and, resuming its normal position, will cause said pinion to again connect with said wheels F and G, and enable the hands to be set from or by the said stem D.

Journaled within the plates A and B at the axis of the wheel F is an arbor, L, that carries upon its end, above said wheel, a toothed wheel, M, which is adapted to engage with a toothed wheel, N, upon the winding-arbor of the mainspring. Said arbor L is capable of a slight longitudinal movement, and upon the lower face of said wheel M are provided pins $m$, that are adapted to engage with correspondingly-shaped openings, $f$, in the face of said wheel F whenever said arbor is depressed, and to be released from engagement whenever said arbor is raised, as seen in Figs. 3 and 5. The elevation of the arbor L is effected by means of a spring, O, which is secured at one end to the plate A, and has its opposite forked end in engagement with a groove, $l$, in said shaft, while the depression of said arbor is secured by means of a stud, P, that passes through the plate A, and has one end secured within said spring, and its opposite end contained within a Λ-shaped notch, $k'$, in the lower side of the bar K. The longitudinal movement of said bar necessary to change the position of the pinion H and disconnect the wheels F and G will, by the action of the inclined side of said notch, force said stud, with its connecting parts, downward to the position shown in Figs. 2 and 4, while by reversing the motion of said push-bar, so as to cause said pinion to again connect said wheels, said spring O will be again permitted to operate to raise said arbor and to disengage the wheel M from the wheel F.

By means of the mechanism shown it will be seen that while the hand-setting and spring-winding devices are disconnected and operate independently, the throwing of one of the same out of gear operates to place the other in position for operation, and that from the manner in which such movements are effected the hands are not liable to be moved from the position to which they have been adjusted.

Having thus fully set forth the nature and merits of our invention, what we claim is—

1. As an improvement in stem-winding and hand-setting watches, in combination with one of the dial-wheels and with a stem-driven wheel, an intermediate wheel which is adapted to rotate in a plane parallel with the watch-plate, and is shiftable in a direction perpendicular thereto to cause said wheels to be connected with or disconnected from each other, substantially as and for the purpose specified.

2. As an improvement in stem-winding and hand-setting watches, in combination with the winding-arbor wheel and with a stem-driven wheel, a wheel which is adapted to rotate in a plane parallel with the watch-plate, and is shiftable in a direction perpendicular thereto to cause said wheels to be connected with or disconnected from each other, substantially as and for the purpose shown.

3. As an improvement in stem-winding and hand-setting watches, a train composed in part of a wheel which is adapted to form a connection between one of the dial-wheels and a stem-driven wheel, and is rotatable in a plane parallel with the watch-plate and shiftable in a direction perpendicular thereto, to connect or disconnect said wheels, in combination with the stem of the watch, and with means, substantially as shown, whereby as said train is thus connected with or disconnected from said dial-wheels said stem is simultaneouly disconnected from or connected with the winding-arbor wheel, substantially as and for the purpose set forth.

4. The combination of the stem D, pinion

E, wheels F and G, pinion H, spring-bar I, and push-bar K, having an inclined end, *k*, substantially as and for the purpose shown and described.

5. The combination of the stem D, pinion E, wheel F, provided with the openings *f*, arbor L, shiftable wheel M, having the engaging-pins *m*, winding-arbor wheel N, spring O, stud P, and push-bar K, provided with the notch *k'*, substantially as and for the purpose specified.

In testimony whereof we have hereunto set our hands the 14th day of July, 1884.

HARRY R. SMITH.
RUFUS FOLSOM.

Witnesses:
RUFUS B. SMITH,
JOHN HECKLE.
Witnesses to R. F.:
WM. B. ORCUTT,
OTTO SHARP.